(12) United States Patent
Aguilar et al.

(10) Patent No.: US 12,736,585 B2
(45) Date of Patent: Sep. 15, 2026

(54) AIRFOIL BEARING ARRANGEMENT AND METHOD FOR MAKING THE SAME

(71) Applicant: Garrett Transportation I Inc., Torrance, CA (US)

(72) Inventors: Scott Aguilar, La Crescenta, CA (US); Luca Tabacchi, Redondo Beach (CA); Patrick Rayner, Torrance, CA (US); Radu Florea, Torrance, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 134 days.

(21) Appl. No.: 18/452,874

(22) Filed: Aug. 21, 2023

(65) Prior Publication Data

US 2025/0043817 A1 Feb. 6, 2025

Related U.S. Application Data

(60) Provisional application No. 63/517,577, filed on Aug. 3, 2023.

(51) Int. Cl.
*F16C 17/02* (2006.01)
*F16C 43/02* (2006.01)

(52) U.S. Cl.
CPC ............ *F16C 17/024* (2013.01); *F16C 43/02* (2013.01); *F05D 2220/40* (2013.01); *F16C 2226/00* (2013.01)

(58) Field of Classification Search
CPC .................................................... F16C 17/024
See application file for complete search history.

(56) References Cited

U.S. PATENT DOCUMENTS 11,306,772 B2 * 4/2022 Omori .................... F16C 27/02
11,585,374 B2 * 2/2023 Tabacchi ................ F16C 27/02
2022/0333638 A1 10/2022 Tabacchi et al.

* cited by examiner

*Primary Examiner* — James Pilkington
(74) *Attorney, Agent, or Firm* — BelayIP

(57) ABSTRACT

A journal foil bearing system includes a journal housing member including a journal housing wall that is disposed about a bore that extends along an axis. The journal housing wall has an inner diameter surface that faces the bore. The journal housing wall locally along the inner diameter surface has a first relief region. A shaft is disposed within the bore and is supported for rotation. A biasing foil member includes at least one biasing foil received within the bore and disposed radially between the journal housing member and the shaft. A top foil member includes at least one top foil disposed within the bore radially between the at least one biasing foil and the shaft. The biasing foil is disposed circumferentially along the inner diameter surface and the first relief region.

17 Claims, 6 Drawing Sheets

AIRFOIL BEARING ARRANGEMENT AND METHOD FOR MAKING THE SAME

CROSS-REFERENCE TO RELATED APPLICATIONS

This application is related to and claims all available benefit of U.S. Provisional Patent Application 63/517,577 filed Aug. 3, 2023, the entire contents of which are herein incorporated by reference.

TECHNICAL FIELD

The present disclosure generally relates to turbomachines. More particularly, the present disclosure relates to turbomachines including an airfoil bearing arrangement and methods for making airfoil bearing arrangements.

BACKGROUND

Various bearing systems are provided for supporting rotation of a shaft within a housing. For example, turbomachines (e.g., turbochargers, superchargers, motorized turbomachines, turbogenerators, etc.) may include one or more air bearings. These bearings preferably support efficient rotation of the shaft, across a wide range of operating conditions, and throughout a long operating lifetime.

Some devices include foil bearing systems (i.e., journal foil bearing systems, foil-air bearing systems, air foil journal bearing, etc.). These bearings include one or more foils that are radially disposed between the shaft and the housing, wherein the foil(s) exert an inwardly directed radial pre-load against the shaft when at-rest. The lift-off speed of the bearing is affected by the amount of pre-load applied to the shaft. Furthermore, wear of the bearing is affected by the amount of applied pre-load. Also, the foil(s) are preferably stiff enough to provide acceptable roto-dynamic behavior/shaft motion control throughout the operating speed range of the shaft.

However, tailoring and controlling these factors for conventional foil bearing systems remains challenging. For example, it can be difficult to control certain dimensions of the bearing components, which can cause the pre-load of the foil bearing to be unacceptable. Manufacture of these bearing systems can also be inefficient due to difficulty in controlling these dimensions, due to a large part count, due to assembly difficulties, and/or for other reasons.

Accordingly, it is desirable to provide a foil bearing system that addresses one of more of the foregoing issues, and methods for making such foil bearing systems. Furthermore, other desirable features and characteristics of the subject matter disclosed herein will become apparent from the subsequent detailed description and the appended claims, taken in conjunction with the accompanying drawings and this background.

BRIEF SUMMARY

Journal foil bearing systems, and methods for making journal foil bearing systems are provided.

In an embodiment, by way of example only, a journal foil bearing system includes a journal housing member including a journal housing wall that is disposed about a bore that extends along an axis. The journal housing wall has an inner diameter surface that faces the bore and that is spaced apart generally a nominal radius distance from the axis. The journal housing wall locally along the inner diameter surface has a first relief region that extends in a depth direction from the bore to an inner relief surface that is spaced apart from the axis a radius distance that is greater than the nominal radius distance. A shaft is disposed within the bore and is supported for rotation about the axis relative to the journal housing member. The journal foil bearing system further includes a biasing foil member and a top foil member. The biasing foil member includes at least one biasing foil received within the bore and disposed radially between the journal housing member and the shaft with respect to the axis. The top foil member includes at least one top foil disposed within the bore radially between the at least one biasing foil and the shaft with respect to the axis. The at least one biasing foil is disposed circumferentially along the inner diameter surface and the first relief region.

In another embodiment, by way of example only, a journal foil bearing system includes a journal housing member including a journal housing wall that is disposed about a bore that extends along an axis. The journal housing wall has an inner diameter surface that faces the bore and that is spaced apart generally a nominal radius distance from the axis. The journal housing wall locally along the inner diameter surface has a first relief region that extends in a depth direction from the bore to an inner relief surface that is spaced apart from the axis a radius distance that is greater than the nominal radius distance. A shaft is disposed within the bore and is supported for rotation about the axis relative to the journal housing member. The journal foil bearing system further includes a biasing foil member and a top foil member. The biasing foil member includes a first biasing foil and a second biasing foil received within the bore and disposed radially between the journal housing member and the shaft with respect to the axis. The top foil member includes a single top foil disposed within the bore radially between the first and second biasing foils and the shaft with respect to the axis. The first biasing foil is disposed circumferentially along the inner diameter surface and the first relief region. The second biasing foil is disposed circumferentially along the inner diameter surface on a side opposite the first relief region.

In another embodiment, by way of example only, a method for making a journal foil bearing system includes providing a journal housing member that includes a journal housing wall disposed about a bore that extends along an axis. The journal housing wall has an inner diameter surface that faces the bore and that is spaced apart generally a nominal radius distance from the axis. The journal housing wall locally along the inner diameter surface has a first relief region that extends in a depth direction from the bore to an inner relief surface that is spaced apart from the axis a radius distance that is greater than the nominal radius distance. The method further includes disposing a foil arrangement within the bore. A shaft is inserted within the bore and is supported with the foil arrangement for rotation about the axis relative to the journal housing member. The foil arrangement includes a biasing foil member and a top foil member. The biasing foil member includes at least one biasing foil received within the bore and disposed radially between the journal housing member and the shaft with respect to the axis. The top foil member includes at least one top foil disposed within the bore radially between the at least one biasing foil and the shaft with respect to the axis. The at least one biasing foil is disposed circumferentially along the inner diameter surface and the first relief region.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Figure 1:
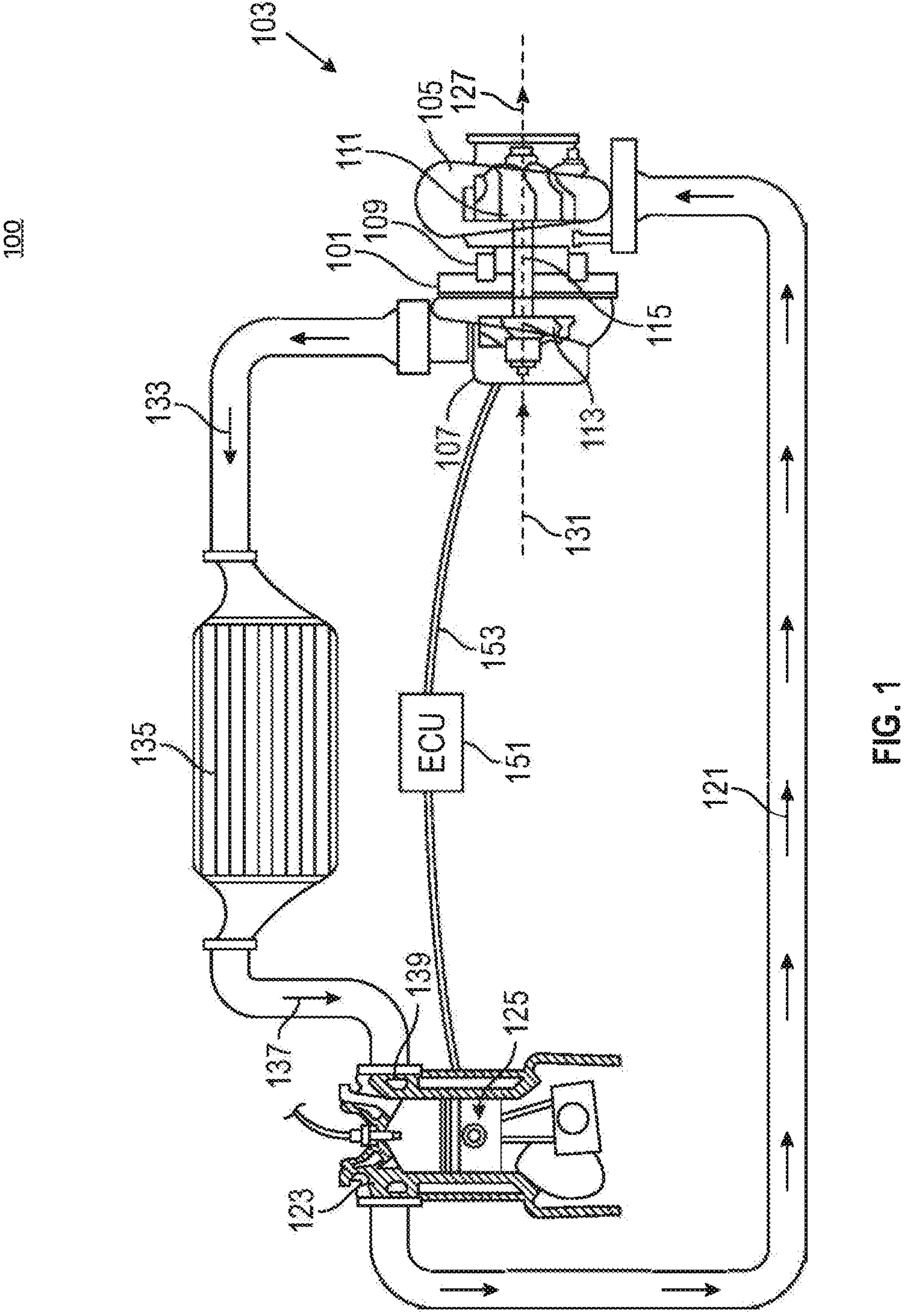
FIG. 1 is a schematic illustration of an engine system with a turbocharger that includes a bearing system according to one or more embodiments of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term “about” is understood as within a range of normal tolerance in the art, for example within 2 standard deviations of the mean. “About” can be understood as within 10%, 5%, 1%, 0.5%, 0.1%, 0.05%, or 0.01% of the stated value. “About” can alternatively be understood as implying the exact value stated. Unless otherwise clear from the context, the numerical values provided herein are modified by the term “about.”

The present disclosure generally relates to journal foil bearing systems and methods for making journal foil bearing systems. In one or more embodiments of the disclosure, a journal foil bearing system includes a journal housing member. The journal housing member includes a journal housing wall that is disposed about a bore that extends along an axis. The journal housing wall has an inner diameter surface that faces the bore and that is spaced apart generally a nominal radius distance from the axis. The journal housing wall locally along the inner diameter surface has at least one relief region that extends in a depth direction from the bore to an inner relief surface that is spaced apart from the axis a radius distance that is greater than the nominal radius distance. A shaft is disposed within the bore and is supported for rotation about the axis relative to the journal housing member.

The journal foil bearing system further includes a biasing foil member and a top foil member. The biasing foil member includes at least one biasing foil received within the bore and disposed radially between the journal housing member and the shaft with respect to the axis. The top foil member includes at least one top foil disposed within the bore radially between the biasing foil(s) and the shaft. The biasing foil(s) is disposed circumferentially along the inner diameter surface and the relief region(s). In an exemplary embodiment, the biasing foil includes an intermediate portion that has an arcuate, elongated form including a wavy pattern of peaks and valleys extending in a circumferential direction between opposing ends. In particular, the peaks and valleys abut adjacent surfaces to provide an inwardly directed pre-load circumferentially around and against the shaft. In one or more embodiments of the disclosure, a plurality of the peaks abuts the inner diameter surface adjacent to the relief region and at least one of the peaks is disposed circumferentially along the relief region. The valleys abut against the at least one top foil that is disposed adjacent to the shaft.

In an exemplary embodiment, advantageously the at least one of the peaks disposed circumferentially along the relief region allows for localized tailoring and/or controlling of the inwardly directed pre-load of the biasing foil(s) against the shaft, for example, when at-rest and/or during lift-off speed rotation of the shaft. Further, in an exemplary embodiment, this arrangement advantageously allows for localized tailoring and/or controlling of the inwardly directed pre-load of the biasing foil(s) to compensate for variation in certain dimensions of one or more of the bearing components that may result during manufacturing and/or assembly.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc. in additional embodiments of the present disclosure. Furthermore, the turbomachine of the present disclosure may be incorporated into a number of systems other than an engine system without departing from the scope of the present disclosure.

The turbocharger 100 may include a housing 103 and a rotating group, which is supported within the housing 103 for rotation about an axis 104 by a bearing system 105. The bearing system 105 may include and/or define at least one air journal foil bearing as will be discussed. It will be appreciated that the air journal foil bearing system 105 may be included in another turbomachine (e.g., an electrically motorized e-compressor, a generator, a compressor device for a fuel-cell system, etc.) without departing from the scope of the present disclosure.

As shown in the illustrated embodiment, the housing 103 may include a turbine housing 106, a compressor housing 107, and a bearing housing 109. The bearing housing 109 may be disposed between the turbine and compressor housings 106, 107.

Additionally, the rotating group -may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the bearing housing 109, to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

Figure 2:
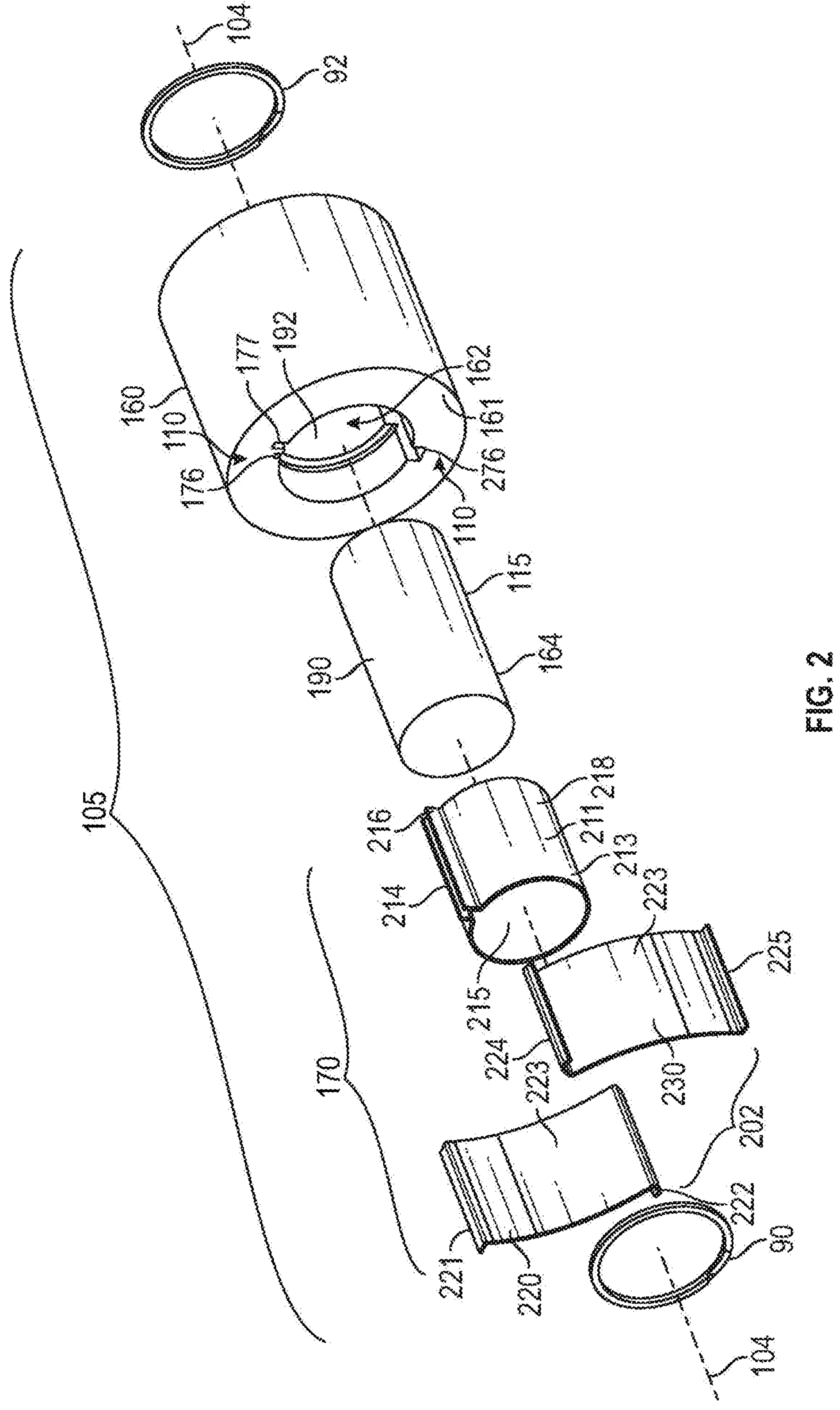
FIG. 2 is a perspective exploded view of a bearing system according to one or more embodiments of the present disclosure.
Figure 4:
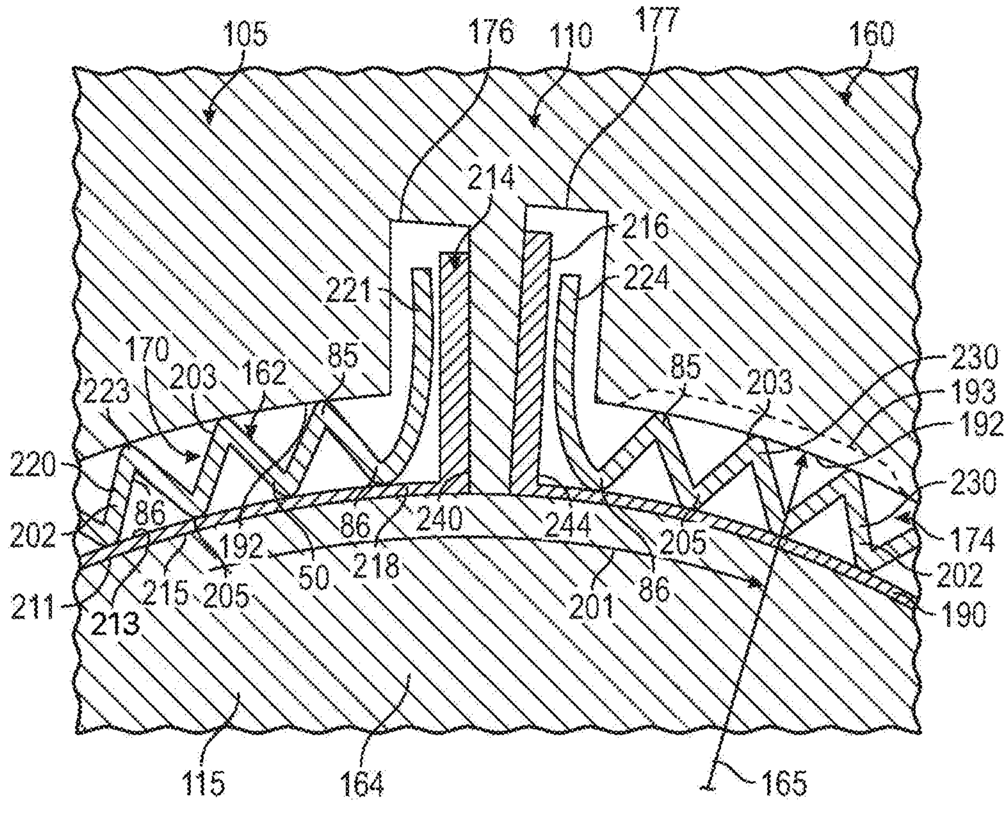
FIG. 4 is a cross-sectional view of a retainer arrangement of a bearing system according to one or more embodiments of the present disclosure.

Referring now to FIGS. 2 and 4, the bearing system 105 will be discussed in greater detail according to example embodiments. As shown, the bearing system 105 (i.e., bearing arrangement) may be a journal foil bearing system 105. As mentioned, the bearing system 105 may be included in the turbocharger 100 of the type represented in FIG. 1, or the bearing system 105 may be included in another turbomachine without departing from the scope of the present disclosure.

Figure 3A:
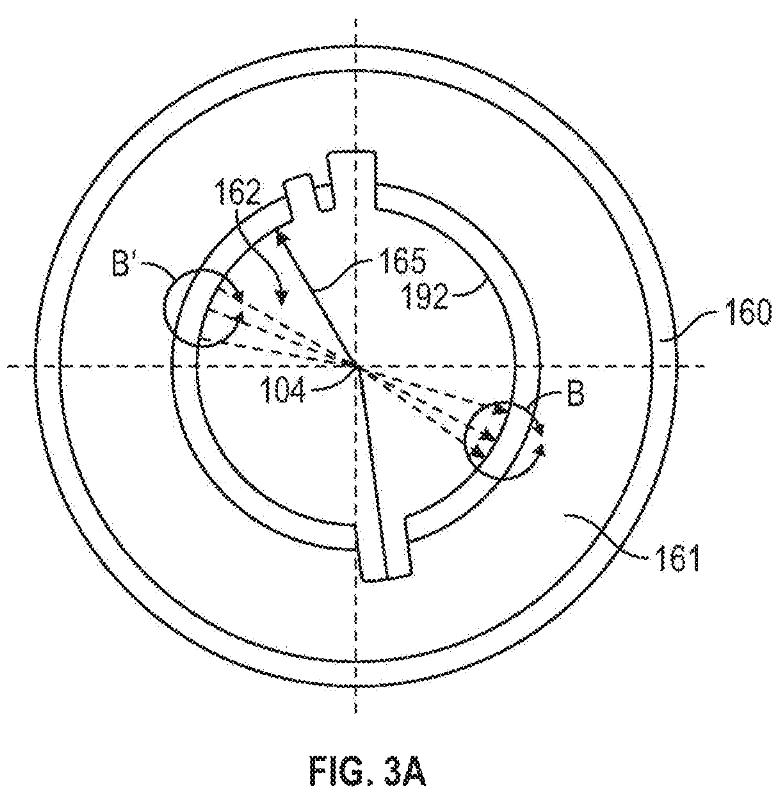
FIG. 3A is a cross-sectional view of a journal housing member including a relief region of a bearing system according to one or more embodiments of the present disclosure.
Figure 3B:
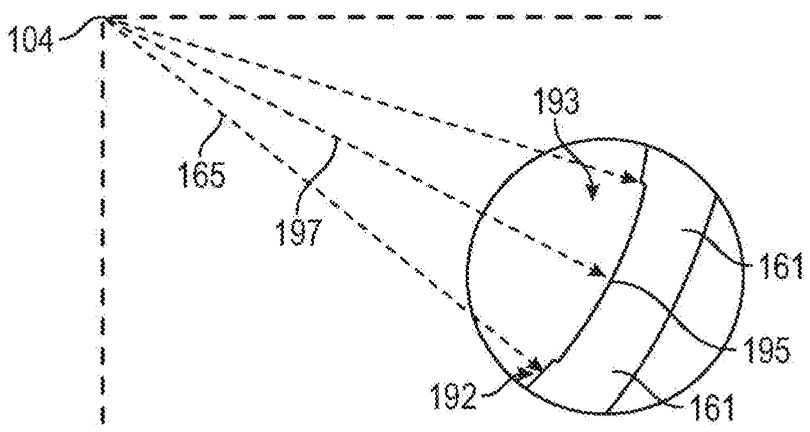
FIG. 3B is an enlarged view of a portion in area B including the relief region of the journal housing member depicted in FIG. 3A.

The bearing system 105 includes a journal housing member 160 with a journal housing wall 161 that is disposed about (e.g., arranged around) a bore 162 that extends along the axis 104. Referring also to FIGS. 3A-3B, the journal housing wall 161 has an inner diameter surface 192 that faces the bore 162 and that is spaced apart generally a nominal radius distance 165 from the axis 104. As will be discussed in further detail below, the journal housing wall 161 locally along the inner diameter surface 192 has a relief region 193 that extends in a depth direction (i.e., radially outward direction from the axis 104 through a thickness of the journal housing wall 161) from the bore 162 to an inner relief surface 195 that is spaced apart from the axis 104 a radius distance 197 that is greater than the nominal radius distance 165.

Referring again to FIGS. 1-2 and 4, the bore 162 receives a segment 164 of the shaft 115. As illustrated, the bearing system 105 also includes a foil arrangement 170 disposed radially between the journal housing member 160 and the segment 164 of the shaft 115. The foil arrangement 170 includes one or more foils that support the shaft 115 for rotation relative to the journal housing member 160. The bearing system 105 may also include a retainer arrangement 110, which may, for example, retain and attach the foil arrangement 170 to the journal housing wall 161 as discussed in further detail below.

Components associated with the bearing system 105 will now be individually discussed, starting with the shaft segment 164. As shown, the shaft segment 164 is cylindrical, with a solid cross section (i.e., not hollow), and may have a circular cross section taken across the axis 104. The outer diameter surface 190 may be smooth and centered about the axis 104. The shaft segment 164 may be integrally attached to both axial ends of the shaft 115 for coupling the rotating group 102 along the turbine section and the compressor section of the turbocharger 100. The shaft segment 164 may be supported for rotation in the clockwise direction (as indicated by arrow 201).

In one or more embodiments of the disclosure, the journal housing member 160 is fixed relative to (e.g., attached to) a surrounding portion of the bearing housing 109. The journal housing member 160 may be integrally attached to another portion of the bearing housing 109. The journal housing member 160 may be an inner area of the bearing housing 109 with the bore 162 extending therethrough. The bore 162 may have a circular cross section with generally the nominal radius distance 165 that is slightly larger than that of a radius of the segment 164 of the shaft 115. Accordingly, an annular gap 174 may be defined between the outer diameter surface 190 of the shaft 115 and the inner diameter surface 192 of the journal housing member 160. The gap 174 receives the foil arrangement 170 (e.g., the foil arrangement 170 is disposed in the gap 174). The gap 174 may be dimensioned according to the size, spring stiffness, and/or other characteristics provided by the foil arrangement 170.

As illustrated, the foil arrangement 170 includes a biasing foil member 202 and a top foil member 211. The biasing foil and top foil members 202, 211 may include thin, sheet-like foil strips, sheets, etc. that wrap and extend at least partly about the shaft segment 164 in the circumferential direction about the axis 104. The foil arrangement 170 is disposed or otherwise received within the gap 174. The foil arrangement 170 is shown in FIG. 4 in a state in which the shaft segment 164 is at rest; however, the foil arrangement 170 may resiliently flex to accommodate and support rotation of the shaft 115 during rotation.

In some embodiments, the biasing foil member 202 of the foil arrangement 170 includes a plurality of biasing foils, such as a first biasing foil 220 and a second biasing foil 230. As illustrated, the first biasing foil 220 is arcuate and elongate, extending in the circumferential direction between a first end 221 and a second end 222. The first end 221 and the second end 222 may project out radially, and an intermediate portion 223 may arcuately extend about the axis 104. The second biasing foil 230 may be substantially similar, except that the second biasing foil 230 may be inverted and disposed on the opposite side of the axis 104. Accordingly, as shown, a second end 224 of the second biasing foil 230 is disposed proximate the first end 221 of the first biasing foil 220. Moreover, a first end 225 of the second biasing foil 230 is disposed proximate the second end 222 of the first biasing foil 220 when the biasing foil member 202 is positioned about the shaft segment 164.

In one or more embodiments of the disclosure, the intermediate portion 223 of the biasing foils 220, 230 may be rippled, corrugated, wavy, or otherwise patterned. The intermediate portion 223 of the biasing foils 220, 230 may be radially disposed between the journal housing member 160 and the top foil member 211. More specifically, the peaks 85 of an outer radial side 203 of the biasing foils 220, 230 may abut against the inner diameter surface 192 of the journal housing member 160, whereas the valleys 86 of an inner radial side 205 of the biasing foils 220, 230 may abut against the top foil member 211.

In some embodiments of the disclosure, the top foil member 211 includes a single top foil 212 in the foil arrangement 170. As shown, the top foil 212 includes a first end 214 (i.e., a first top foil end), a second end 216 (i.e., a second top foil end), and an intermediate portion 218 that extends circumferentially between the first and second ends 214, 216. The intermediate portion 218 may be rounded and may follow a substantially circular path. The intermediate portion 218 may be radially disposed between the biasing foil member 202 and the outer diameter surface 190 of the shaft segment 164. As discussed above, the valleys of the rippled biasing foil member 202 abut an outer radial side 213 of the top foil 212. An inner radial side 215 of the top foil 212 layers over and abuts against the outer diameter surface 190 of the shaft segment 164.

As illustrated, the first and second ends 214, 216 are substantially flat and planar. The first and second ends 214, 216 project outward radially from the arcuate intermediate portion 218. The first and second ends 214, 216 also extend along the axis 104. In some embodiments, the first and second ends 214, 216 may extend substantially parallel to each other in the outward, radial direction.

The first and second ends 214, 216 may define part of the retainer arrangement 110 of the bearing system 105. Furthermore, the retainer arrangement 110 may include one or more grooves (i.e., apertures, openings, etc.) included in the bore 162 of the journal housing member 160. For example, in some embodiments, the journal housing member 160 includes internal grooves 176, 177, and 276 that are circumferentially spaced apart from each other.

As shown, the internal groove 176, 177, and 276 are recessed into the journal housing member 160 radially in the depth directions from the inner diameter surface 192 of the bore 162. Also, the internal grooves 176, 177, and 276 may be elongate and may extend substantially parallel to the axis of rotation 104 the shaft 115.

As illustrated, the internal grooves 176 and 177 receive the first and second ends 214, 216 of the top foil 212, respectively, as well as the first end 221 and second end 224 of the biasing foil member 202, respectively. Accordingly, the top foil 212 is well-supported and retained in the internal grooves 176 and 177. Further, the internal groove 276 receives the first end 225 of the second biasing foil 230 and the second end 222 of the first biasing foil 220. As such, the first and second biasing foils 220 and 230 are well-supported and retained in the internal grooves 176, 177, and 276. Additionally, in some embodiments, the bearing system 105 includes retainer rings 90 and 92 that retain the foil arrangement 170 axially in the bore 162 of the journal housing member 160.

Figure 5:
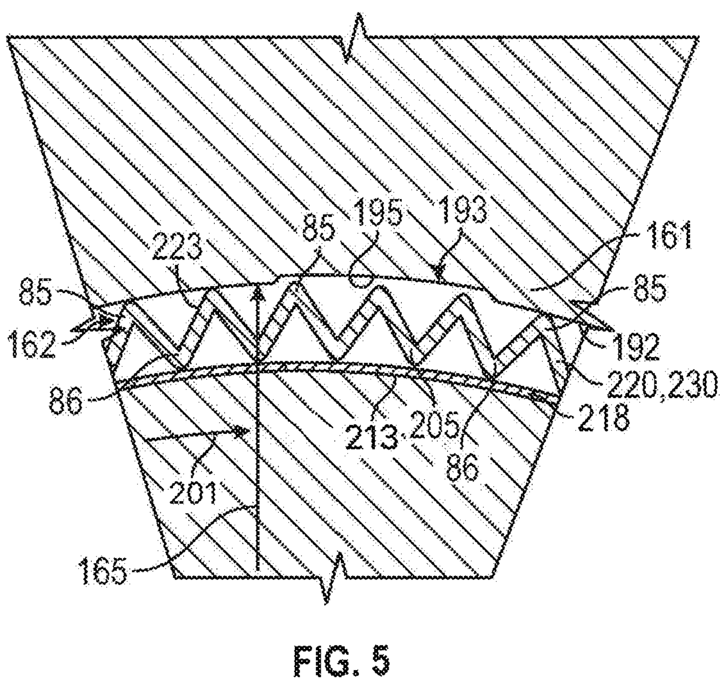
FIG. 5 is a cross-sectional view of a bearing system including a relief region according to one or more embodiments of the present disclosure.
Figure 6:
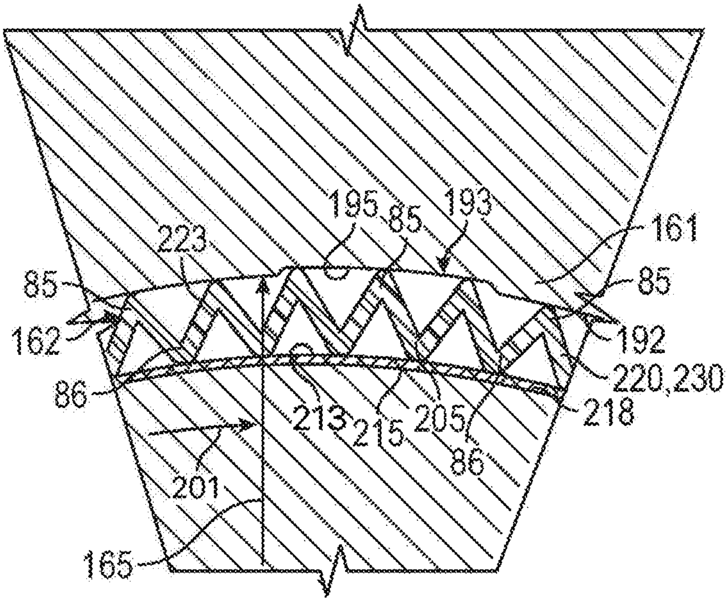
FIG. 6 is a cross-sectional view of a bearing system including a relief region according to one or more embodiments of the present disclosure.

Referring to FIGS. 3A-3B and 5, as discussed above, the journal housing wall 161 locally along the inner diameter surface 192 has the relief region 193 that extends from the bore 162 to the inner relief surface 195 to provide a localized relief region that allows for tailoring and/or controlling of the inwardly directed pre-load of the biasing foil(s) 220 and 230. In one or more embodiments of the disclosure, one of the biasing foils 220, 230 is disposed circumferentially along the inner diameter surface 192 and extends across the relief region 193. As illustrated, the intermediate portion 223 of the biasing foil 230 is disposed circumferentially along the inner diameter surface 192 and the relief region 193. The peaks 85 of the biasing foil 230 abuts the inner diameter surface 192 adjacent to the relief region 193 and at least one of the peaks 85 is disposed circumferentially along the relief region 193. In an exemplary embodiment, one or more of the peaks 85 are disposed circumferentially along the relief region 193, such as at least 2 adjacent peaks 85, for example, 3 or more peaks 85 are disposed circumferentially along the relief region 193. As illustrated, the one or more peaks 85 disposed along the relief region 193 are spaced apart from the inner relief surface 195. In an exemplary embodiment, the one or more peaks 85 disposed along the relief region 193 are spaced apart from the inner relief surface 195 a distance of from about 0.025 mm to about 0.25 mm. Alternatively, and with reference to FIG. 6, in an exemplary embodiment, the one or more peaks 85 of the biasing foil 220, 230 that are disposed circumferentially along the relief region 193 abut the inner relief surface 195.

As illustrated in FIGS. 4-5, the one or more peaks 85 that are disposed circumferentially along the relief region 193 are interposed between the plurality of peaks 85 of the biasing foils 220, 230. Alternatively, and with reference to FIG. 4, the one or more peaks disposed circumferentially along the relief region 193 (indicated by dashed line segments) may be disposed adjacent to one of the ends 221, 222, 224, or 225 of the biasing foil 220, 230. A retainer ring 240 on one axial side of the foil arrangement and another retainer ring 244 on the opposite axial side is also depicted.

Referring again to FIGS. 3A-3B, the journal housing wall 161 may include more than one relief region 193 (designated areas B and B') that are circumferentially spaced apart from each other and that extend in the depth direction from the bore 162 to corresponding inner relief surfaces 195. Likewise, the intermediate portions of the corresponding biasing foils 220, 230 are disposed circumferentially along the inner diameter surface 192 and the corresponding relief regions 193 as discussed above. In an exemplary embodiment, the relief regions 193 in areas B and B' are disposed on opposing sides of the inner diameter surface 192, such as being diametrically opposed, or alternatively, at an angle to each other relative to the axis 104 of from about 120° to about 179°. In an exemplary embodiment, a difference between the radius distance 197 and the nominal radius distance 165 is from about 0.025 mm to about 0.25 mm.

Figure 7:
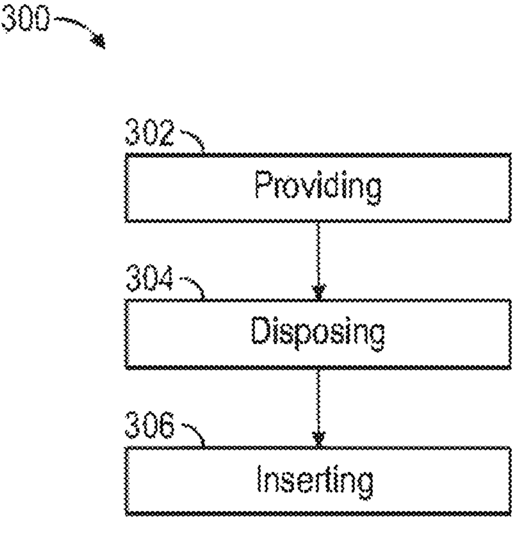
FIG. 7 illustrates a method of making a bearing system according to one or more embodiments of the present disclosure.

Referring to FIG. 7, a method 300 for making a journal foil bearing system is provided. The method includes providing (STEP 302) a journal housing member that includes a journal housing wall disposed about a bore that extends along an axis. The journal housing wall has an inner diameter surface that faces the bore and that is spaced apart generally a nominal radius distance from the axis. The journal housing wall locally along the inner diameter surface has a first relief region that extends in a depth direction from the bore to an inner relief surface that is spaced apart from the axis a radius distance that is greater than the nominal radius distance.

The method 300 further includes disposing (STEP 304) a foil arrangement within the bore. A shaft is inserted (STEP 306) within the bore and supported with the foil arrangement for rotation about the axis relative to the journal housing member. The foil arrangement includes a biasing foil member and a top foil member. The biasing foil member includes at least one biasing foil received within the bore and disposed radially between the journal housing member and the shaft with respect to the axis. The top foil member includes at least one top foil disposed within the bore radially between the at least one biasing foil and the shaft with respect to the axis. The at least one biasing foil is disposed circumferentially along the inner diameter surface and the first relief region.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A journal foil bearing system comprising:

a journal housing member comprising a journal housing wall that is disposed about a bore that extends along an axis, the journal housing wall having an inner diameter surface that faces the bore and that is spaced apart generally a nominal radius distance from the axis, wherein the journal housing wall locally along the inner diameter surface has a first relief region that extends in a depth direction from the bore to an inner relief surface that is spaced apart from the axis a radius distance that is greater than the nominal radius distance;

a shaft disposed within the bore and supported for rotation about the axis relative to the journal housing member; and a biasing foil member and a top foil member, the biasing foil member comprising at least one biasing foil received within the bore and disposed radially between the journal housing member and the shaft with respect to the axis, the top foil member comprising at least one top foil disposed within the bore radially between the at least one biasing foil and the shaft with respect to the axis, wherein the at least one biasing foil is disposed circumferentially along the inner diameter surface and the first relief region;

wherein the at least one biasing foil comprises a first biasing foil having first opposing ends that are retained by the journal housing wall and a first intermediate portion that is disposed between the first opposing ends, wherein the first intermediate portion is disposed circumferentially along the inner diameter surface and the first relief region;

wherein the first intermediate portion has an arcuate, elongated form comprising a wavy pattern including peaks and valleys extending in a circumferential direction between the opposing ends, and wherein a plurality of the peaks abuts the inner diameter surface adjacent to the first relief region and at least one of the peaks is disposed circumferentially along the first relief region; and wherein the at least one of the peaks is spaced apart from the inner relief surface.

2. The journal foil bearing system of claim 1, wherein the at least one of the peaks comprises two adjacent peaks that are disposed circumferentially along the first relief region.

3. The journal foil bearing system of claim 1, wherein the at least one of the peaks comprises three adjacent peaks that are disposed circumferentially along the first relief region.

4. The journal foil bearing system of claim 1, wherein the at least one of the peaks that is disposed circumferentially along the first relief region is disposed adjacent to one of the first opposing ends.

5. The journal foil bearing system of claim 1, wherein the at least one of the peaks that is disposed circumferentially along the first relief region is disposed between the plurality of peaks that abuts the inner diameter surface adjacent to the first relief region.

6. The journal foil bearing system of claim 1, wherein the journal housing wall locally along the inner diameter surface has a second relief region that that is circumferentially spaced apart from the first relief region and that extends in the depth direction from the bore to a corresponding inner relief surface that is spaced apart from the axis a corresponding radius distance that is greater than the nominal radius distance, and wherein the at least one biasing foil further comprises a second biasing foil having second opposing ends retained by the journal housing wall and a second intermediate portion that is disposed between the second opposing ends, wherein the second intermediate portion is disposed circumferentially along the inner diameter surface and the second relief region.

7. The journal foil bearing system of claim 6, wherein the first and second relief regions are disposed on opposing sides of the inner diameter surface.

8. The journal foil bearing system of claim 7, wherein the first and second relief regions are diametrically opposed.

9. The journal foil bearing system of claim 7, wherein the first and second relief regions are disposed at an angle to each other relative to the axis of from about 120° to about 179°.

10. The journal foil bearing system of claim 1, wherein a difference between the radius distance and the nominal radius distance is from about 0.025 mm to about 0.25 mm.

11. The journal foil bearing system of claim 1, wherein at least one peak of the at least one biasing foil that is disposed circumferentially along the first relief region is spaced apart from the inner relief surface by a distance from about 0.025 mm to about 0.25 mm.

12. A journal foil bearing system comprising:

a journal housing member comprising a journal housing wall that is disposed about a bore that extends along an axis, the journal housing wall having an inner diameter surface that faces the bore and that is spaced apart generally a nominal radius distance from the axis, wherein the journal housing wall locally along the inner diameter surface has a first relief region that extends in a depth direction from the bore to an inner relief surface that is spaced apart from the axis a radius distance that is greater than the nominal radius distance;

a shaft disposed within the bore and supported for rotation about the axis relative to the journal housing member; and a biasing foil member and a top foil member, the biasing foil member comprising a first biasing foil and a second biasing foil received within the bore and disposed radially between the journal housing member and the shaft with respect to the axis, the top foil member comprising a single top foil disposed within the bore radially between the first and second biasing foils and the shaft with respect to the axis;

wherein the first biasing foil is disposed circumferentially along the inner diameter surface and the first relief region, wherein the second biasing foil is disposed circumferentially along the inner diameter surface on a side opposite the first relief region, and wherein at least one peak of the first biasing foil is disposed circumferentially along the first relief region and is spaced apart from the inner relief surface by a distance from about 0.025 mm to about 0.25 mm.

13. The journal foil bearing system of claim 12, wherein the journal housing wall further comprises a second relief region disposed circumferentially from the first relief region, the first and second relief regions being disposed at an angle relative to the axis of from about 120° to about 179°.

14. The journal foil bearing system of claim 12, wherein the first biasing foil includes an intermediate portion having an arcuate, elongated form with a wavy pattern including peaks and valleys extending in a circumferential direction between opposing ends, wherein the wavy pattern includes the at least one peak of the first biasing foil that is disposed circumferentially along the first relief region and spaced apart from the inner relief surface, and a plurality of additional peaks abutting the inner diameter surface adjacent to the first relief region, and wherein elastic deformation of the wavy pattern peaks compensates for dimensional variation in the journal housing member, the foil arrangement, or the shaft resulting from manufacturing or assembly tolerances.

15. The journal foil bearing system of claim 12, wherein the journal housing wall defines axially extending grooves recessed from the inner diameter surface and dimensioned to receive ends of the top foil and the first and second biasing foils so as to retain the first and second foils in position during operation.

16. A method for making a journal foil bearing system, the method comprising:

providing a journal housing member that comprises a journal housing wall disposed about a bore that extends along an axis, the journal housing wall having an inner diameter surface that faces the bore and that is spaced apart generally a nominal radius distance from the axis, wherein the journal housing wall locally along the inner diameter surface has a first relief region that extends in a depth direction from the bore to an inner relief surface that is spaced apart from the axis a radius distance that is greater than the nominal radius distance;

disposing a foil arrangement within the bore;

inserting a shaft within the bore and supporting the shaft with the foil arrangement for rotation about the axis relative to the journal housing member, wherein the foil arrangement comprises a biasing foil member and a top foil member, the biasing foil member comprising at least one biasing foil received within the bore and disposed radially between the journal housing member and the shaft with respect to the axis, the top foil member comprising at least one top foil disposed within the bore radially between the at least one biasing foil and the shaft with respect to the axis, wherein the at least one biasing foil is disposed circumferentially along the inner diameter surface and the first relief region;

wherein the at least one biasing foil comprises a first biasing foil having first opposing ends and a first intermediate portion that is disposed between the first opposing ends, wherein disposing the foil arrangement further comprises retaining the first opposing ends by the journal housing wall and disposing the first intermediate portion circumferentially along the inner diameter surface and the first relief region;

wherein the first intermediate portion has an arcuate, elongated form comprising a wavy pattern including peaks and valleys extending in a circumferential direction between the opposing ends, and wherein disposing the first intermediate portion comprises abutting a plurality of the peaks against the inner diameter surface adjacent to the first relief region and disposing at least one of the peaks circumferentially along the first relief region; and wherein disposing the first intermediate portion comprises disposing at least two adjacent peaks circumferentially along the first relief region.

17. The method of claim 16, further comprising the steps of:

providing a second relief region in the journal housing wall, wherein the first and second relief regions are disposed on opposing sides of the inner diameter surface and are separated by an angle relative to the axis of from about 120° to about 179°;

inserting the first opposing ends of the first biasing foil and the ends of the top foil into axially-extending grooves formed in the inner diameter surface of the journal housing wall;

wherein the at least one of the peaks disposed along the first relief region is spaced apart from the inner relief surface by a distance from about 0.025 mm to about 0.25 mm; and wherein disposing the first biasing foil further comprises compensating for variation in dimensional tolerances among the journal housing member, foil arrangement, and shaft.

* * * * *